(12) United States Patent
Nakao et al.

(10) Patent No.: US 10,407,314 B2
(45) Date of Patent: Sep. 10, 2019

(54) CHABAZITE-TYPE ZEOLITE AND METHOD OF MANUFACTURING CHABAZITE-TYPE ZEOLITE

(71) Applicant: TOSOH CORPORATION, Yamaguchi (JP)

(72) Inventors: Keita Nakao, Yamaguchi (JP); Ko Ariga, Yamaguchi (JP); Hidekazu Aoyama, Yamaguchi (JP); Satoshi Nakamura, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 82 days.

(21) Appl. No.: 15/899,958

(22) Filed: Feb. 20, 2018

(65) Prior Publication Data

US 2018/0237307 A1    Aug. 23, 2018

(30) Foreign Application Priority Data

Feb. 22, 2017    (JP) .................................. 2017-030725

(51) Int. Cl.
  *C01B 39/48*    (2006.01)
  *B01J 29/70*    (2006.01)
  (Continued)

(52) U.S. Cl.
  CPC .......... *C01B 39/48* (2013.01); *B01D 53/9418* (2013.01); *B01D 53/9422* (2013.01);
  (Continued)

(58) Field of Classification Search
  CPC .. C01B 39/48; C01P 2002/60; C01P 2002/86; C01P 2004/61; C01P 2004/62;
  (Continued)

(56) References Cited

U.S. PATENT DOCUMENTS 4,544,538 A    10/1985    Zones
4,665,110 A     5/1987    Zones
(Continued)

OTHER PUBLICATIONS

"J. Phys. Chem C, 114", 2010, pp. 1633-1640.
"Zeolites, Vol. 8", 1988, pp. 166-174.

*Primary Examiner* — David M Brunsman
(74) *Attorney, Agent, or Firm* — Greenblum & Bernstein, P.L.C.

(57) ABSTRACT

A process of manufacturing a chabazite-type zeolite is provided having high heat resistance without having a large crystal size. A catalyst is also provided that contains such a chabazite-type zeolite and exhibits high nitrogen oxide reduction properties, and in particular high nitrogen oxide reduction properties in low temperatures below 200° C., even after exposure to high temperature and high humidity. A chabazite-type zeolite is provided having a silica to alumina molar ratio of no less than 15, a silanol group to silicon molar ratio of no more than $1.6 \times 10^{-2}$, an average crystal size of 0.5 μm to less than 1.5 μm, and a ratio of 50%-volume particle size to 10%-volume particle size of no more than 3.2. The chabazite-type zeolite preferably contains at least one of copper and iron.

5 Claims, 1 Drawing Sheet

(51) Int. Cl.
  *B01J 37/00*   (2006.01)
  *B01D 53/94*   (2006.01)
  *B01J 37/02*   (2006.01)
  *B01J 29/76*   (2006.01)
  *B01J 35/00*   (2006.01)
  *B01J 35/02*   (2006.01)
  *B01J 35/04*   (2006.01)
  *F01N 3/20*    (2006.01)

(52) U.S. Cl.
  CPC ......... *B01J 29/7015* (2013.01); *B01J 29/763* (2013.01); *B01J 35/002* (2013.01); *B01J 35/0013* (2013.01); *B01J 35/023* (2013.01); *B01J 35/026* (2013.01); *B01J 35/04* (2013.01); *B01J 37/0009* (2013.01); *B01J 37/0246* (2013.01); *B01D 2255/20761* (2013.01); *B01D 2255/50* (2013.01); *B01J 2229/186* (2013.01); *C01P 2002/60* (2013.01); *C01P 2002/82* (2013.01); *C01P 2002/86* (2013.01); *C01P 2004/61* (2013.01); *C01P 2004/62* (2013.01); *C01P 2006/37* (2013.01); *F01N 3/2066* (2013.01); *F01N 2610/02* (2013.01)

(58) Field of Classification Search
  CPC .................................................. C01P 2006/37; B01L 29/7015; B01L 29/763; B01D 53/9418
  See application file for complete search history.

(56) References Cited

U.S. PATENT DOCUMENTS

| | | | |
|---|---|---|---|
| 6,709,644 B2* | 3/2004 | Zones | B01D 67/0051 423/213.2 |
| 10,029,247 B2* | 7/2018 | Ariga | B01D 53/02 |
| 2003/0069449 A1 | 4/2003 | Zones et al. | |
| 2008/0202107 A1 | 8/2008 | Boorse et al. | |
| 2010/0092362 A1 | 4/2010 | Li | |
| 2011/0182790 A1 | 7/2011 | Chandler et al. | |
| 2011/0251048 A1 | 10/2011 | Ariga et al. | |
| 2012/0269719 A1 | 10/2012 | Moden et al. | |

* cited by examiner

CHABAZITE-TYPE ZEOLITE AND METHOD OF MANUFACTURING CHABAZITE-TYPE ZEOLITE

FIELD OF THE INVENTION

The present invention relates to a chabazite-type zeolite.

BACKGROUND OF THE INVENTION

Chabazite-type zeolite is a zeolite having a three-dimensional fine pore structure that includes eight-member oxygen rings forming 3.8×3.8 Å pores. Chabazite-type zeolite occurs naturally, but chabazite-type zeolite having a high silica to alumina molar ratio (hereafter also referred to as "$SiO_2/Al_2O_3$ ratio") is exclusively synthesized artificially (see, for example, Patent Literatures 1 to 3, Non-patent Literatures 1 and 2).

Patent Literatures 1 and 2 disclose SSZ-13 as a chabazite-type zeolite having an $SiO_2/Al_2O_3$ ratio of at least 5. Moreover, Non-patent Literature 1 and Non-patent Literature 2 disclose SSZ-13 in an aggregated form, where crystal particles are bonded to one another chemically. In addition, Patent Literature 3 discloses, under the name SSZ-62, a chabazite-type zeolite having the same crystal structure as SSZ-13, as well as an $SiO_2/Al_2O_3$ ratio greater than 10 and a crystal size of no more than 0.5 µm.

These chabazite-type zeolites are used as various kinds of catalysts, including cracking catalysts and nitrogen oxide reduction catalysts, and among the applications as catalysts, these chabazite-type zeolites are widely used as nitrogen oxide reduction catalysts that operate by selective catalytic reduction (Patent Literatures 4 to 6). Yet SSZ-13 and SSZ-62 have frameworks that readily break down when exposed to high-temperature, high-humidity atmospheres. Therefore, up to this point, there has been investigation into a chabazite-type zeolite capable of withstanding use as a nitrogen oxide reduction catalyst which operates by selective catalytic reduction.

A chabazite-type zeolite that combines an average crystal size of 1.5 µm or greater and an $SiO_2/Al_2O_3$ ratio of 15 or greater (Patent Literature 7) has been investigated as an example of a chabazite-type zeolite having a framework that is unlikely to decompose even when exposed to high-temperature, high-humidity atmospheres (that is, having a high level of heat resistance). A chabazite-type zeolite has also been disclosed that, due to crystallizing raw materials that do not include a structure directing agent, has a crystal size greater than 0.5 µm as well as an $SiO_2/Al_2O_3$ ratio of 5 to no more than 15. This chabazite-type zeolite has a broad size distribution for its crystal particles, the chabazite-type zeolite including crystal particles having a crystal size greater than 0.5 µm to around 3 µm, and is specifically disclosed in scanning electron microscope photographs where these crystal particles are aggregated together (Patent Literature 8).

RELATED ART

Patent Literature

Patent Literature 1: U.S. Pat. No. 4,544,538
Patent Literature 2: U.S. Pat. No. 4,665,110
Patent Literature 3: U.S. Patent Publication No. 2003/0069449
Patent Literature 4: U.S. Patent Publication No. 2011/0182790
Patent Literature 5: U.S. Patent Publication No. 2008/0202107
Patent Literature 6: U.S. Patent Publication No. 2010/0092362
Patent Literature 7: U.S. Patent Publication No. 2011/0251048
Patent Literature 8: U.S. Patent Publication No. 2012/0269719

Non-Patent Literature

Non-patent Literature 1: J. Phys. Chem. C, 114 (2010) 1633-1640
Non-patent Literature 2: ZEOLITES, Vol. 8 (1988) 166-174

SUMMARY OF THE INVENTION

Problems to be Solved by the Invention

As disclosed in Patent Literatures 7 and 8, conventionally, it has been necessary to increase the crystal size in order to improve the heat resistance of chabazite-type zeolites. However, when the crystal size becomes too large, use of the chabazite-type zeolite as a catalyst becomes difficult due to the difficulty of coating the crystals onto a filter or the like. Therefore, there are limits to improving heat resistance through increasing crystal size.

In view of the above, the present invention provides a chabazite-type zeolite having high heat resistance without having a large crystal size. Moreover, the present invention separately provides a catalyst containing such a chabazite-type zeolite and exhibiting high nitrogen oxide reduction properties, and in particular high nitrogen oxide reduction properties in low temperatures below 200° C., even after exposure to high temperature and high humidity.

Solution to the Problems

The inventors have conducted investigations into catalysts for selective catalytic reduction of nitrogen oxide and into a chabazite-type zeolite suitable to be a substrate for the catalyst. As a result, the inventors focused on the crystal state of chabazite-type zeolite, and thereby discovered an improvement to the heat resistance of chabazite-type zeolite without necessitating an increase in crystal size.

Specifically, the present invention may be summarized as follows.

[1] A chabazite-type zeolite having a silica to alumina molar ratio of no less than 15, a silanol group to silicon molar ratio of no more than $1.6 \times 10^{-2}$, an average crystal size of 0.5 µm to less than 1.5 µm, and a ratio of 50%-volume particle size to 10%-volume particle size of no more than 3.2.

[2] The chabazite-type zeolite according to [1], in which the average crystal size is 0.5 µm to no more than 1.3 µm.

[3] The chabazite-type zeolite according to one of [1] and [2], in which the 50%-volume particle size is no more than 5.0 µm.

[4] The chabazite-type zeolite according to any one of [1] to [3], in which crystal particles have at least one shape selected from among cuboid, rhomboid, and substantially spherical.

[5] The chabazite-type zeolite according to any one of [1] to [4], in which the XRD pattern of the chabazite-type zeolite includes at least the XRD peaks given in the following table.

TABLE 1

| 2θ | Relative intensity* |
|---|---|
| 9.44°~9.88° | 100 ≤ x ≤ 180 |
| 16.03°~16.55° | 20 ≤ x ≤ 50 |
| 17.81°~18.24° | 20 ≤ x ≤ 50 |
| 20.62°~21.30° | 100 |
| 25.02°~25.50° | 20 ≤ x ≤ 70 |

*Relative intensity is the value relative to an intensity of 2θ = 20.62° to 21.30°

[6] The chabazite-type zeolite according to any one of [1] to [5], in which, in the IR spectrum, the chabazite-type zeolite includes at least an absorption peak in a range of 1800 cm$^{-1}$ to no more than 1930 cm$^{-1}$, an absorption peak in a range of 3550 cm$^{-1}$ to no more than 3700 cm$^{-1}$, and an absorption peak in a range of 3710 cm$^{-1}$ to no more than 3745 cm$^{-1}$.

[7] The chabazite-type zeolite according to any one of [1] to [6], in which the chabazite-type zeolite contains at least one of copper and iron.

[8] The chabazite-type zeolite according to [7], in which a ratio of the at least one of copper and iron to alumina is 0.1 to no more than 1.0.

[9] A manufacturing method of the chabazite-type zeolite according to any one of [1] to [8] that includes a crystallization step of crystallizing a composition that contains a silica source, aluminum source, alkali source, structure directing agent, and water, where the composition has a sodium to silica molar ratio greater than zero, a potassium to sodium molar ratio less than 1.0, a structure directing agent to silica molar ratio less than 0.1, a water to silica molar ratio less than 20, and a silica to alumina molar ratio of 27.5 to less than 50.0.

[10] The manufacturing method according to [9], in which the structure directing agent is at least one selected from among an N,N,N-trialkyladamantane ammonium cation, an N,N,N-trimethylbenzyl ammonium cation, an N-alkyl-3-quinuclidinol cation, and an N,N,N-trialkyl exoaminonorbornane cation.

[11] The manufacturing method according to one of [9] and [10], in which the structure directing agent to silica molar ratio is 0.06 to less than 0.1.

[12] The manufacturing method according to any one of [9] to [11], in which the potassium to sodium molar ratio is 0 to no more than 0.6.

[13] The manufacturing method according to any one of [9] to [12], in which the composition does not contain fluorine.

[14] A catalyst containing the chabazite-type zeolite according to any one of [1] to [8].

[15] A nitrogen oxide reduction method using the chabazite-type zeolite according to any one of [1] to [8].

Effect of the Invention

The present invention can provide a chabazite-type zeolite having high heat resistance without having a large crystal size. Moreover, the present invention can provide a catalyst containing such a chabazite-type zeolite. The catalyst is suitable as a nitrogen oxide reduction catalyst, and in particular as a nitrogen oxide reduction catalyst operating by selective catalytic reduction.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Hereafter, a chabazite-type zeolite according to an embodiment of the present invention is described.

The present embodiment relates to a chabazite-type zeolite, and further relates to a synthetic chabazite-type zeolite. A chabazite-type zeolite is a crystalline aluminosilicate having a CHA structure. A CHA structure is a crystal structure specified by a IUPAC structural code (hereafter referred to simply as "structural code") and defined by the International Zeolite Association (IZA). The crystal structure of a zeolite can be identified by comparison to one of an powder X-ray diffraction (hereafter also referred to as "XRD") pattern described in *Collection of simulated XRD powder patterns for zeolites*, Fifth revised edition (2007), and an XRD pattern described in "Zeolite Framework Types" on the homepage of the Structure Commission of the IZA (http://www.iza-structure.org/databases/).

The chabazite-type zeolite according to the present embodiment has a silica to alumina molar ratio (hereafter also referred to as "$SiO_2/Al_2O_3$ ratio") of 15 or greater. When the $SiO_2/Al_2O_3$ molar ratio is less than 15, durability when used in applications that experience exposure to high temperature and high humidity is excessively reduced. The higher the $SiO_2/Al_2O_3$ ratio, the higher heat resistance tends to become. However, the chabazite-type zeolite according to the present embodiment may have an $SiO_2/Al_2O_3$ ratio of 15 to less than 50, preferably of 20 to no more than 35, more preferably of 25 to no more than 35, and still more preferably of 26 to less than 31.

Preferably, the chabazite-type zeolite according to the present embodiment is a crystalline aluminosilicate. The crystalline aluminosilicate has aluminum (Al) and silicon (Si) as framework metals (hereafter also referred to as "T-atoms"), and has a framework configured by a three-dimensional network structure in which the T-atoms are bonded via oxygen (O). A theoretical crystalline aluminosilicate is configured from only the network structure. In contrast, the frameworks of crystalline aluminosilicates that exist in the real world include irregularities such as Si—O—Si bond cleavage, loss of T-atoms, or siloxy defects. Such irregularities form the terminals of the network structure or edges within the network structure (hereafter, these are also collectively referred to as "framework end parts"), and the framework end part is a silanol group (Si—OH). Accordingly, a silanol group is contained in the framework of real-world crystalline aluminosilicates.

Being a crystalline aluminosilicate, the more silicon a zeolite contains, the greater the amount of a silanol group (hereafter referred to as "amount of silanol") that tends to be contained in the zeolite framework. Therefore, zeolite having an $SiO_2/Al_2O_3$ ratio of less than 5 (hereafter also referred to as "low-silica zeolite") tends to have a smaller amount of silanol than a zeolite having an $SiO_2/Al_2O_3$ ratio greater than 5 (hereafter also referred to as "high-silica zeolite"). However, because the $SiO_2/Al_2O_3$ ratio of low-silica zeolite is too low, the heat resistance of low-silica zeolite is lower than that of high-silica zeolite, and low-silica zeolite is not appropriate for use that undergoes exposure to high-temperature and high-humidity atmospheres. The chabazite-type zeolite according to the present embodiment is a high-silica zeolite, but contains a small amount of silanol. This makes decomposition of the framework less likely to occur, and therefore the chabazite-type zeolite according to the present embodiment has high crystallinity at high temperatures, and even after exposure to a high-temperature, high-humidity atmosphere.

The chabazite-type zeolite according to the present embodiment has a silanol group to silicon molar ratio (hereafter also referred to as "SiOH/Si ratio") of $1.6 \times 10^{-2}$ or less, preferably $1.5 \times 10^{-2}$ or less, and more preferably $1.3 \times 10^{-2}$ or less. The SiOH/Si ratio of the chabazite-type zeolite according to the present invention is greater than zero, and may include $0.5 \times 10^{-2}$ or greater, more preferably $0.7 \times 10^{-2}$ or greater, and still more preferably $1.1 \times 10^{-2}$ or greater. Preferably, the SiOH/Si ratio of the chabazite-type zeolite according to the present embodiment is $1.05 \times 10^{-2}$ to no more than $1.60 \times 10^{-2}$, and $1.10 \times 10^{-2}$ to no more than $1.50 \times 10^{-2}$.

By combining the noted $SiO_2/Al_2O_3$ ratio and SiOH/Si ratio, the chabazite-type zeolite according to the present embodiment exhibits high thermal resistance even at a small crystal size, and framework decomposition is unlikely to advance even when the chabazite-type zeolite is exposed to high temperature and high humidity.

The SiOH/Si ratio can be found from the amount of silanol, which is found from a $^1H$ MAS NMR spectrum, relative to an amount of silicon in the chabazite-type zeolite.

The amount of silicon in the chabazite-type zeolite can be determined by X-ray fluorescence analysis or some other composition analysis. Examples of a method of measuring the amount of silicon using X-ray fluorescence analysis can include a measurement method using a standard curve method. The standard curve used in the standard curve method can be created from eight to fifteen points by measuring the intensity of X-ray fluorescence peaks corresponding to the silicon (Si) in silicon-containing compounds having a known amount of silicon and drawing a standard curve between the intensities and the amounts of silicon. The amount of silicon in the chabazite-type zeolite can be measured by measuring the intensity of the X-ray fluorescence peaks corresponding to silicon (Si) in an X-ray fluorescence pattern for a chabazite-type zeolite sample, and comparing the intensities with the standard curve.

The amount of silanol can be found from the $^1H$ MAS NMR spectrum. One example of a method of finding the amount of silanol is to perform a $^1H$ MAS NMR measurement of dehydrated chabazite-type zeolite and to calculate the amount of silanol from the obtained $^1H$ MAS NMR spectrum using the standard curve method.

A more specific example of a method of measuring the amount of silanol is to hold the chabazite-type zeolite at 350 to 400° C. in vacuum evacuation for 5±2 hours and dehydrate the chabazite-type zeolite, after which the chabazite-type zeolite is collected under a nitrogen atmosphere and weighed, then performing a $^1H$ MAS NMR measurement. The amount of silanol in the chabazite-type zeolite can be found using the standard curve method, from the integrated intensity of the peaks (peaks of 2.0±0.5 ppm) belonging to the silanol group in the $^1H$ MAS NMR spectrum obtained through this measurement.

When the chabazite-type zeolite according to the present embodiment combines the $SiO_2/Al_2O_3$ ratio and the SiOH/Si ratio described above, the amount of silanol is not restricted. The amount of silanol in the chabazite-type zeolite according to the present embodiment can be, for example, $1.5 \times 10^{20}$ parts/g or less ($2.49 \times 10^4$ mol/g or less), more preferably $1.4 \times 10^{20}$ parts/g or less ($2.32 \times 10^4$ mol/g or less), and still more preferably $1.3 \times 10^{20}$ parts/g or less ($2.16 \times 10^4$ mol/g or less). The amount of silanol in the chabazite-type zeolite according to the present embodiment is greater than 0 parts/g.

As depicted in FIG. 1A, a particle of the chabazite-type zeolite according to the present embodiment is a crystal particle grown from individual, isolated primary particles. The primary particle and the crystal particle have similar shapes; that is, at least any one shape selected from a group composed of a cuboid, a rhombus, or a substantially spherical shape. Therefore, a majority of the chabazite-type zeolite according to the present embodiment is a crystal particle that can be considered a primary particle. In contrast, as depicted in FIG. 1B, chabazite-type zeolite may also have crystal particles formed by primary particles chemically bonding and aggregating with each other. Such crystal particles configured by aggregates formed when the primary particles chemically bond with each other are particles having a polyhedral or irregular shape, and even when the particles have cuboid or rhomboid ridges, such particles cannot be considered primary particles.

The chabazite-type zeolite according to the present embodiment has an average crystal size of 0.5 μm to less than 1.5 μm, preferably 0.5 μm to no more than 1.3 μm, and more preferably more than 0.5 μm to no more than 1.3 μm. Use of crystal particles having an average crystal size of less than 0.5 μm as an adsorbent or a catalyst support decreases durability. Meanwhile, when the average crystal size is 1.5 μm or greater, the chabazite-type zeolite more readily contains coarse particles and when such particles are coated on a honeycomb support, coating defects such as clogging or peeling occur more readily, and creating a molded body having high compression strength is difficult when molding the particles.

The average crystal size of the chabazite-type zeolite according to the present embodiment refers to the average particle size of the primary particles based on SEM observation. The average crystal size based on SEM observation refers to an average value for particle size of the primary particles (primary particle size) measured from an observation image obtained with a scanning electron microscope (SEM). More specifically, in a SEM observation image observed at a given magnification where crystal particles configured by at least 150 primary particles can be observed, the average crystal size refers to an average value for the diameter of chabazite-type zeolite crystal particles present in the field of view of the observation image.

The average crystal size based on the SEM observation can be measured by, for example, taking the arithmetic mean of the particle sizes, measured in any fixed direction, of crystal particle s configured from at least 150 primary particles selected as desired in one or a plurality of observation fields imaged at 5000 times magnification. The conditions of the SEM observation are not particularly limited so long as the shape and number of the crystal particle s configured by the primary particles can be clearly observed, but can, for example, be a SEM observation carried out at 3000 to 15,000 times magnification.

One example of characteristic of the crystal particles of the chabazite-type zeolite according to the present embodiment may be small amount of agglomerates in which the primary particles are physically flocculated (an example with a small number of so-called secondary particles). A agglomerate status of the primary particles can be measured by a particle size measurement utilizing volume distribution.

An example of the chabazite-type zeolite according to the present embodiment may have a 50%-volume particle size of 5.8 µm or less, more preferably 5.0 µm or less, and still more preferably 4.5 µm or less. Thus, agglomerates are less likely to form in the chabazite-type zeolite according to the present embodiment, regardless of whether the crystal particles are comparatively small, than in a small-particle-size chabazite-type zeolite having a similar crystal size as conventionally published.

The chabazite-type zeolite according to the present embodiment has a small number of agglomerates, and therefore one feature of the chabazite-type zeolite according to the present embodiment is that a ratio of the 50%-volume particle size to the 10%-volume particle size (hereafter also referred to as "volume particle size ratio") is 3.2 or less, preferably 3.0 or less, and more preferably 2.8 or less. In order to facilitate handling during manufacturing, the volume particle size ratio is preferably 1.0 or greater, more preferably 1.3 or greater, and still more preferably 2.0 or greater. Exemplary ranges of the volume particle size ratio may include 1.0 to no more than 3.2, and more preferably 1.3 to no more than 2.8.

The 10%-volume particle size and the 50%-volume particle size indicate the particle size for volume fractions of 10% and 50%, respectively, in a particle size measurement by volume distribution. Examples of conditions for the particle size measurement by volume distribution can include the following.

Measurement method: Laser diffraction/scattering
Refractive index: 1.66, dispersion medium 1.33
Measured sample: Slurry composed of 1 wt % measured powder and 99 wt % dispersion medium
Dispersion medium: Pure water
Pretreatment conditions: Process measured sample (slurry) in ultrasonic homogenizer for two minutes By combining the noted $SiO_2/Al_2O_3$ ratio and SiOH/Si ratio, deterioration (that is, framework decomposition) of the chabazite-type zeolite according to the present embodiment is unlikely to advance when the chabazite-type zeolite is exposed to high temperature and high humidity, even when the average crystal size becomes not large. Thus, the chabazite-type zeolite according to the present embodiment undergoes little reduction in crystallinity and therefore exhibits elevated heat resistance.

When evaluating heat resistance, zeolite can be exposed to high temperature and high humidity using a hydrothermal durability treatment. The following conditions can exemplify conditions for the hydrothermal durability treatment.

Treatment atmosphere: Circulated air containing 10 vol % water vapor
Space velocity: 6,000 $hr^{-1}$
Treatment temperature: 900±5° C.
Treatment time: 1 hour to no more than 24 hours Framework decomposition of the zeolite is more greatly influenced by the treatment temperature than the treatment time of the hydrothermal durability treatment, and framework decomposition of the zeolite advances significantly accompanying a rise in treatment temperature. For example, framework decomposition of the zeolite advances more for a hydrothermal durability treatment having a treatment temperature of 900° C. and treatment time of one hour than for a hydrothermal durability treatment having a treatment temperature of 700° C. and treatment time of 24 hours.

The evaluation of heat resistance can be checked by comparing changes in the degree of crystallinity before and after exposing the zeolite to high temperature and high humidity. With a chabazite-type zeolite, the intensity of the $2\theta=21\pm1°$ peak in the XRD pattern serves as an indicator of crystallinity, and by comparing the degrees of crystallinity of zeolite samples subjected to the hydrothermal durability treatment, the relative degrees of crystallinity among the different zeolites can be compared. The greater the intensity after the hydrothermal durability treatment, the greater the heat resistance exhibited.

Preferably, the XRD pattern of the chabazite-type zeolite according to the present embodiment includes at least the XRD peaks given in the following table.

TABLE 2

| | Relative intensity* | |
|---|---|---|
| 2θ | Preferred value | More preferred value |
| 9.44°~9.88° | 100 ≤ x ≤ 180 | 151 ≤ x ≤ 175 |
| 16.03°~16.55° | 20 ≤ x ≤ 50 | 20 ≤ x ≤ 40 |
| 17.81°~18.24° | 20 ≤ x ≤ 50 | 20 ≤ x ≤ 40 |
| 20.62°~21.30° | 100 | 100 |
| 25.02°~25.50° | 20 ≤ x ≤ 70 | 30 ≤ x ≤ 65 |

*Relative intensity is the value relative to an intensity of 2θ = 20.62° to 21.30°

Examples of the conditions of the XRD measurement according to the present embodiment can include the following.

Radiation source: CuK α rays (λ=1.5405 Å)
Measurement mode: Step scan
Scan condition: 0.04°/sec
Measurement time: 3 seconds
Measurement range: 2θ=4° to 44°

In the IR spectrum, the chabazite-type zeolite according to the present embodiment preferably includes at least an absorption peak in a range of 1800 $cm^{-1}$ to no more than 1930 $cm^{-1}$ (hereafter referred to as "peak 1"), an absorption peak in a range of 3550 $cm^{-1}$ to no more than 3700 $cm^{-1}$ (hereafter referred to as "peak 2"), and an absorption peak in a range of 3710 $cm^{-1}$ to no more than 3745 $cm^{-1}$ (hereafter referred to as "peak 3").

The chabazite-type zeolite according to the present embodiment may also include an absorption peak in a range of 3450 $cm^{-1}$ to no more than 3545 $cm^{-1}$ (hereafter referred to as "peak 4").

Peak 1 is preferably an absorption peak in a range of 1850 $cm^{-1}$ to no more than 1890 $cm^{-1}$, peak 2 is preferably an absorption peak in a range of 3665 $cm^{-1}$ to no more than 3695 $cm^{-1}$, and peak 3 is preferably an absorption peak in a range of 3720 $cm^{-1}$ to no more than 3740 $cm^{-1}$.

The chabazite-type zeolite according to the present embodiment preferably has a ratio of the maximum intensity of peak 2 to the maximum intensity of peak 1 (hereafter also called "IR ratio$_{P2/P1}$") of 0.1 to no more than 1.5, and more preferably 0.5 to no more than 1.0.

The chabazite-type zeolite according to the present embodiment preferably has a ratio of the maximum intensity of peak 3 to the maximum intensity of peak 1 (hereafter also called "IR ratio$_{P3/P1}$") of 1.5 to no more than 2.5, and more preferably 1.6 to no more than 2.0.

The chabazite-type zeolite according to the present embodiment preferably has a ratio of the maximum intensity of peak 4 to the maximum intensity of peak 1 (hereafter also called "IR ratio$_{P4/P1}$") of 0 to no more than 1.0, and more preferably 0 to no more than 0.1.

In the chabazite-type zeolite according to the present embodiment, peak 2 is an absorption peak in a range of 3665 $cm^{-1}$ to no more than 3695 $cm^{-1}$, and more preferably the IR ratio$_{P2/P1}$ fulfills a range of 0.1 to no more than 1.5 and the IR ratio$_{P3/P1}$ fulfills a range of 1.5 to no more than 2.5.

Examples of the IR spectrum measurement conditions according to the present embodiment can include the following.

Measurement method: Diffuse reflection
Range of measured wavelengths: 400 to 4000 cm$^{-1}$
Resolution: 4 cm$^{-1}$
Cumulative trials: 128

The IR spectrum and XRD pattern of the chabazite-type zeolite noted above are preferably for a state where the chabazite-type zeolite does not contain an organic structure directing agent.

The chabazite-type zeolite according to the present embodiment preferably contains transition metal, more preferably contains at least one of iron (Fe) or copper (Cu), and still more preferably contains copper. This yields a chabazite-type zeolite that is not only highly heat resistant, but also exhibits an elevated nitrogen oxide reduction property. Therefore, a chabazite-type zeolite according to the present embodiment that contains a transition metal (hereafter also referred to as "the metal-containing chabazite-type zeolite") can be provided as a catalyst, can further be provided as a nitrogen oxide reduction catalyst, and still further as a nitrogen oxide reduction catalyst exhibiting elevated nitrogen oxide reduction properties.

The metal-containing chabazite-type zeolite preferably contains a metal in other than the T-atoms, such as pores, surfaces, or the like.

When the metal-containing chabazite-type zeolite contains copper, the copper to alumina molar ratio (hereafter also referred to as either "Cu/Al$_2$O$_3$ ratio" or "Cu/Al$_2$ ratio") is preferably 0.1 to no more than 1.0, and more preferably 0.4 to no more than 0.8.

After being exposed to high temperature and high humidity, the metal-containing chabazite-type zeolite exhibits a particularly elevated nitrogen oxide reduction property at temperatures less than 200° C. One reason for this may be that the chabazite-type zeolite according to the present embodiment is highly heat resistant.

Because the framework is unlikely to decompose, the metal-containing chabazite-type zeolite exhibits elevated nitrogen oxide reduction properties as compared to conventional metal-containing chabazite-type zeolites even after being exposed to high temperature and high humidity, and particularly exhibits elevated nitrogen oxide reduction properties at lower temperatures less than 200° C. The nitrogen oxide reduction properties of the metal-containing chabazite-type zeolite are particularly elevated in a temperature range of 100° C. to no more than 250° C., preferably 100° C. to no more than 200° C., and more preferably 150° C. to no more than 200° C.

Next, a method of manufacturing the chabazite-type zeolite according to the present embodiment is described.

The chabazite-type zeolite according to the present invention can be manufactured by a manufacturing method that includes a crystallization step of crystallizing a composition that contains a silica source, aluminum source, alkali source, structure directing agent, and water (hereafter also referred to as "raw material composition"), where the composition has a sodium to silica molar ratio greater than zero, a potassium to sodium molar ratio less than 1.0, a structure directing agent to silica molar ratio less than 0.1, a water to silica molar ratio less than 20, and a silica to alumina molar ratio of 27.5 to less than 50.0.

The manufacturing method according to the present embodiment relates to a method of manufacturing a chabazite-type zeolite in which the raw material composition containing the structure directing agent (hereafter also referred to as "SDA") is crystallized. When a composition that does not contain SDA is crystallized, even in cases where chabazite-type zeolite particles having a crystal size greater than 0.5 μm are obtained, the primary particles in such particles are strongly bonded by chemical bonds. Such particles are aggregates configured by an assemblage of primary particles in which crystal growth has occurred without regular orientation. Not only do the aggregates become bulky because the cohesion of the particles is difficult to break apart with post-crystallization processing, but the crystals themselves may decompose with the application of a physical force such as pulverization. Therefore, a chabazite-type zeolite configured from aggregates is not suited to use as a catalyst or catalyst support.

Furthermore, the manufacturing method according to the present embodiment relates to a method of manufacturing a chabazite-type zeolite in which a raw material composition having a sodium to silica molar ratio greater than zero, and containing at least sodium, is crystallized. By including SDA and sodium, crystal growth due to chemical bonding between the primary particles is inhibited and the crystal growth of individual primary particles readily advances without being affected by other primary particles. As a result, crystal particles that have been grown from individual, isolated primary particles can be obtained. Accordingly, the individual crystal particles have at least one of a particle shape that reflects the shape of the primary particle, or a substantially spherical particle shape. Moreover, with such agglomerates, formed by physical agglomerates are unlikely to form, and a chabazite-type zeolite can be obtained that is configured from crystal particles having dispersed primary particles. In other words, using the manufacturing method of the present invention, both agglomerates and aggregates are unlikely to develop, and crystal particles configured by highly dispersible primary particles can be obtained. In other words, with the manufacturing method according to the present embodiment, a chabazite-type zeolite can be obtained having crystal particles that are not excessively large and that have a small volume particle size ratio.

The silica source is a compound that includes silicon (Si), and may be at least one selected from among colloidal silica, precipitated silica, amorphous silica, sodium silicate, tetraethyl orthosilicate, or amorphous aluminosilicate, and more preferably is amorphous aluminosilicate.

The alumina source is a compound that includes aluminum (Al), and may be at least one selected from among aluminum sulfate, sodium aluminate, aluminum hydroxide, aluminum chloride, or amorphous aluminosilicate, and more preferably is amorphous aluminosilicate.

The silica source and the alumina source are preferably in a form that can be mixed to sufficient uniformity with other raw materials, and are preferably amorphous aluminosilicate.

The alkali source is a compound that contains an alkali metal. The alkali source in the manufacturing method according to the present embodiment is a compound that contains at least sodium, and is preferably a compound that contains sodium and a compound containing at least one selected from among potassium, rubidium, and cesium. Examples of the compound containing the alkali metal can include one selected from among a hydroxide, fluoride, bromide, iodide, sulfate, nitrate, or carbonate of an alkali metal.

When the raw materials other than the silica source, the alumina source, and the like contained in the raw material composition include at least one selected from among sodium, potassium, rubidium, and cesium, these raw materials can also serve as the alkali source.

The water included in the raw material composition may be pure water, but when the other raw materials contained in the raw material composition contain water in aqueous solution or the like, the water content of these raw materials can also serve as the water contained in the raw material composition.

In the present embodiment, the SDA is preferably an organic structure directing agent; is more preferably at least one selected from among an N,N,N-trialkyladamantane ammonium cation, an N,N,N-trimethylbenzyl ammonium cation, an N-alkyl-3-quinuclidinol cation, and an N,N,N-trialkyl exoaminonorbornane cation; is further preferably at least one of an N,N,N-trialkyladamantane ammonium cation and an N,N,N-trimethylbenzyl ammonium cation; and is still more preferably an N,N,N-trialkyladamantane ammonium cation (hereafter also referred to as "TAAD$^{+}$"). A preferred example of the TAAD$^{+}$ is N,N,N-trimethyladamantane ammonium (hereafter also referred to as "TMAD$^{+}$").

The SDA may be included in the raw material composition in salt form, and is preferably at least one selected from among a hydroxide, bromide, iodide, carbonate, methyl carbonate salt, and sulfate containing any of the above-noted cations; is more preferably at least one selected from among a hydroxide, bromide, and iodide; and is still more preferably a hydroxide.

For example, when the SDA is TMAD$^{+}$, examples of the TMAD$^{+}$ salt can include at least one selected from among an N,N,N-trimethyladamantane ammonium hydroxide, an N,N,N-trimethyladamantane ammonium fluoride, an N,N,N-trimethyladamantane ammonium bromide, an N,N,N-trimethyladamantane ammonium iodide, an N,N,N-trimethyladamantane ammonium carbonate, an N,N,N-trimethyladamantane ammonium methylcarbonate salt, and an N,N,N-trimethyladamantane ammonium sulfate; is preferably at least one of an N,N,N-trimethyladamantane ammonium hydroxide and an N,N,N-trimethyladamantane ammonium halide; and is more preferably an N,N,N-trimethyladamantane ammonium hydroxide (hereafter also referred to as "TMADOH"). In the present embodiment, TMAD$^{+}$ is preferably the only organic structure directing agent contained in the raw material composition.

When the raw material composition contains chlorine or fluorine, due to the corrosiveness of these elements, a corrosion-resistant manufacturing device must be used, which is likely to increase manufacturing costs. Therefore, the raw material composition preferably does not contain fluorine, more preferably does not contain at least one of chlorine and fluorine, and preferably does not contain chlorine or fluorine. Given measurement errors and the like, the chlorine content and fluorine content of the raw material composition is preferably no more than 6000 ppm of each, and more preferably is no more than 1000 ppm of each.

The raw material composition has a silica to alumina molar ratio ($SiO_2/Al_2O_3$ ratio) of 27.5 to less than 50.0, and preferably 27.8 to less than 50.0. In the crystallization step, the $SiO_2/Al_2O_3$ ratio of the resultant chabazite-type zeolite tends to be lower than the $SiO_2/Al_2O_3$ ratio of the raw material composition. When the $SiO_2/Al_2O_3$ ratio is less than 27.5, crystallizing a chabazite-type zeolite having the $SiO_2/Al_2O_3$ ratio of the present invention becomes difficult, and the physical flocculation of the resultant chabazite-type zeolite tends to become more powerful. When the $SiO_2/Al_2O_3$ ratio becomes too high, a zeolite other than a chabazite-type zeolite is created, and obtaining a single phase chabazite-type zeolite becomes difficult. Therefore the $SiO_2/Al_2O_3$ ratio is less than 50.0, and is preferably no more than 40.0. Examples of particularly preferred ranges for the $SiO_2/Al_2O_3$ ratio can include 27.5 to no more than 40.0, and 30.0 to no more than 35.0 is further preferred.

The raw material composition has an SDA to silica molar ratio (hereafter referred to as "$SDA/SiO_2$ ratio") of less than 0.1, and preferably no more than 0.095, and more preferably no more than 0.085. When the raw material composition has a water to silica molar ratio (hereafter referred to as "$H_2O/SiO_2$ ratio") detailed below and an $SDA/SiO_2$ ratio of 0.1 or greater, the resultant chabazite-type zeolite becomes excessively fine. Because SDA is expensive, when the $SDA/SiO_2$ ratio is 0.1 or greater, manufacturing costs increase.

Because the raw material composition contains SDA, the $SDA/SiO_2$ ratio is greater than zero, but with an $SDA/SiO_2$ ratio of 0.05 or greater, and more preferably 0.06 or greater, crystallization of the chabazite-type zeolite is promoted. Accordingly, crystallization of zeolites other than the chabazite-type zeolite, crystallization of mixtures of the chabazite-type zeolite and a zeolite other than the chabazite-type zeolite, and the like tend to be less likely to occur, and a single phase chabazite-type zeolite tends to be more readily obtained. From a perspective of obtaining a crystallization time suitable for industrial manufacturing, the $SDA/SiO_2$ ratio is preferably 0.06 to less than 0.1, and is more preferably 0.07 to no more than 0.09.

The raw material composition has a water ($H_2O$) to silica molar ratio ($H_2O/SiO_2$ ratio) of less than 20, and preferably of no more than 19. When the raw material composition has the $SDA/SiO_2$ ratio described above and an $H_2O/SiO_2$ ratio of less than 20, the resultant chabazite-type zeolite is unlikely to become fine. In addition, when the $H_2O/SiO_2$ ratio is 20 or greater, crystallization of the chabazite-type zeolite of the present invention is unlikely to advance with the ranges for the $OH/SiO_2$ ratio given below. Meanwhile, the raw material composition contains water, and therefore the $H_2O/SiO_2$ ratio is greater than zero, but when the $H_2O/SiO_2$ ratio is 5 or greater, and further is 9 or greater, a reasonable fluidity can be imparted to the raw material composition, and the raw material composition more readily becomes a uniform mixture. Examples of more preferred $H_2O/SiO_2$ ratios can include 10 to less than 20, and more preferably 11 to no more than 19. Examples of particularly preferred $H_2O/SiO_2$ ratios can include 11 to no more than 18, and more particularly 11 to no more than 16.

The raw material composition has a sodium to silica molar ratio (hereafter also referred to as "$Na/SiO_2$ ratio") greater than zero, and includes at least sodium. The $Na/SiO_2$ ratio is preferably 0.02 or greater, and is more preferably 0.04 or greater. The $Na/SiO_2$ ratio is preferably 0.1 or less, and is more preferably 0.08 or less. With these ranges for the $Na/SiO_2$ ratio, in the raw material composition having the $SiO_2/Al_2O_3$ ratio, the $SDA/SiO_2$ ratio, and the $H_2O/SiO_2$ ratio of the present invention, dissolution of the silica source is promoted and efficient crystallization of the chabazite-type zeolite readily occurs.

The raw material composition preferably has a potassium to sodium molar ratio (hereafter referred to as "K/Na ratio") of less than 1.0, and preferably 0.6 or less. The raw material composition need not contain potassium, but also may contain potassium (in other words, the K/Na ratio may be zero or greater). However, when the raw material composition contains potassium as well as sodium, the creation of zeolites other than chabazite-type zeolites is further inhibited. Meanwhile, when potassium is contained in a greater quantity than sodium, the crystal particles tend to become excessively large, or the crystal particles tend to physically flocculate and agglomerates are more readily produced. Accordingly, when the raw material composition contains potassium, examples of preferred K/Na ratios can include 0 to less than 1.0, more preferably 0.1 to less than 1.0, even more preferably 0 to no more than 0.6, even more preferably 0 to no more than 0.3, and even more preferably 0.2 to no more than 0.6.

The raw material composition preferably has a hydroxide ion to silica molar ratio (hereafter referred to as "OH/SiO$_2$ ratio") of 0.1 to less than 0.9, and more preferably of 0.15 to no more than 0.5. When the OH/SiO$_2$ ratio is 0.1 or greater, crystallization of the chabazite-type zeolite advances more readily. When 0.9 or greater, dissolution of the silica source is promoted, and therefore the CHA structure single phase chabazite-type zeolite combining the SiO$_2$/Al$_2$O$_3$ ratio and SiOH/Si ratio according to the present embodiment tends to become more difficult to obtain.

In the crystallization step, the raw material composition is crystallized via hydrothermal treatment. The crystallization advances at 80° C. and above.

The manufacturing process can be carried out by placing the raw material composition in a sealed pressure container and crystallizing the composition for a sufficient amount of time at a desired temperature from 100 to 200° C. An example of a preferred crystallization temperature is 155° C. to no more than 185° C. The crystallization may be carried out in a state where the raw material composition is left to stand, but is preferably carried out in a state where the raw material composition is mixed by stirring. The amount of time for crystallization can, for example, be 1 hour to no more than 100 hours, and more preferably can be 10 hours to no more than 80 hours.

After the crystallization step, the method of manufacturing the chabazite-type zeolite according to the present embodiment may also include one or more of a washing step, a drying step, an SDA removal step, and an ammonium treatment step.

In the washing step, the post-crystallization chabazite-type zeolite and a liquid phase undergo solid/liquid separation. In the washing step, the solid/liquid separation may be performed using a known method, and the chabazite-type zeolite obtained in the solid phase may be washed with pure water.

In the drying step, moisture is removed from the chabazite-type zeolite. Any conditions may be used for the drying step, but an exemplary drying can be performed by using a spray dryer or letting the chabazite-type zeolite stand in atmosphere at 50° C. to no more than 150° C., and more preferably at 100° C. to no more than 150° C., for two hours or more.

The SDA removal step is performed in order to remove the SDA contained in the chabazite-type zeolite. Ordinarily, the SDA is carried in the pores of a chabazite-type zeolite that has passed through the crystallization step. Therefore, the SDA can be removed as necessary.

Any method can be used for the SDA removal step so long as the method removes the SDA. Examples of such removal methods can include at least one selected from among a liquid phase treatment using an acidic aqueous solution, an exchange treatment using resin or the like, a thermal decomposition treatment, and a calcination treatment. From a perspective of manufacturing efficiency, the SDA removal step is preferably one of a thermal decomposition treatment and a calcination treatment. An example of the SDA removal step is a step where the chabazite-type zeolite is treated in atmosphere at 400° C. to no more than 700° C.

The ammonium treatment step is performed in order to remove the alkali metal contained in the chabazite-type zeolite. The ammonium treatment step can be performed with a generic method. For example, an aqueous solution containing ammonium ions may be brought into contact with the chabazite-type zeolite.

When the chabazite-type zeolite according to the present embodiment is a metal-containing chabazite-type zeolite, the manufacturing method according to the present embodiment may also include a metal inclusion step where the chabazite-type zeolite and a compound containing at least one of copper and iron (hereafter referred to as a "metal-containing compound") are brought into contact.

In the metal inclusion step, the chabazite-type zeolite is brought into contact with the metal-containing compound, whereby the at least one of copper and iron can be forced into the pores of the chabazite-type zeolite. The method of bringing the chabazite-type zeolite and the metal-containing compound into contact (hereafter also referred to as a "metal inclusion method") can be any method that causes the chabazite-type zeolite to contain the at least one of copper and iron. Examples of the metal inclusion method can be at least one selected from among an ion exchange method, an impregnation support method, an evaporative drying method, a precipitation support method, and a physical mixing method. The metal inclusion method is preferably an impregnation support method, because such a method readily controls the amount of the at least one of copper and iron that is contained in the chabazite-type zeolite.

The metal-containing compound used in the metal inclusion step may be any metal-containing compound, examples of which can include at least one selected from among nitrate, sulfate, acetate, chloride, a complex salt, an oxide, and a complex oxide containing at least one of copper and iron. A compound in aqueous solution containing at least one of copper and iron is preferred as the metal-containing compound because the at least one of copper and iron can be more readily included uniformly in the chabazite-type zeolite. At least one selected from among nitrate, sulfate, and acetate containing at least one of copper and iron is preferred.

The manufacturing method according to the present embodiment preferably includes a calcination step of calcining the metal-containing chabazite-type zeolite obtained from the metal inclusion step. Depending on the metal inclusion method, there may be residual impurities, such as counter-ions of the metal compound, and such impurities are removed in the calcining step. The calcining step can be any calcination treatment of the metal-containing chabazite-type zeolite under any conditions. Exemplary calcining conditions can include, for example, calcining in atmosphere at a calcination temperature of 500° C. to no more than 700° C. for a calcination time of 0.5 hours to no more than 5 hours.

The chabazite-type zeolite and the metal-containing chabazite-type zeolite according to the present embodiment (hereafter also referred to as "the chabazite-type zeolites") can be used as a catalyst. A catalyst containing the chabazite-type zeolites (hereafter also referred to as "the catalyst") can be used in either a powder or molded form. When the catalyst is used in powder form, the catalyst may be a catalyst member, where the catalyst powder is applied onto a honeycomb substrate or the like or is rendered as a washcoat. When the catalyst is used in molded form, the catalyst can have at least one shape selected from among spherical, substantially spherical, elliptical, disk-like, round columnar, polyhedral, irregular, or petaloid, or can have some other shape suited for the intended use.

Moreover, when the catalyst has a molded form, in addition to the catalyst, a clay selected from at least one of silica, alumina, kaolin, attapulgite, montmorillonite, bentonite, allophane, and sepiolite may be included.

In particular, the catalyst is preferably used as a nitrogen oxide reduction catalyst, and is more preferably used as a reduction catalyst for nitrogen oxide in exhaust gas of an internal combustion engine.

The nitrogen oxide reduction may occur through bringing the catalyst into contact with a gas containing nitrogen oxide. The space velocity when bringing the gas containing nitrogen oxide into contact with the catalyst may be any value, examples of which may include, in volume reference, 500 to 500,000 $hr^{-1}$, and more preferably 2000 to 300,000 $hr^{-1}$.

Examples of the nitrogen oxide reduced by the catalyst can include at least one selected from among nitrogen monoxide, nitrogen dioxide, dinitrogen trioxide, dinitrogen tetroxide, and dinitrogen monoxide, and can include at least one selected from among nitrogen monoxide, nitrogen dioxide, and dinitrogen monoxide.

The gas containing the nitrogen oxide may also include components other than the nitrogen oxide, and examples of the gas containing the nitrogen oxide can include a gas containing nitrogen oxide and at least one selected from among a hydrocarbon, carbon monoxide, carbon dioxide, hydrogen, nitrogen, oxygen, sulfur oxide, and water. Specifically, examples of the gas containing nitrogen oxide can include exhaust gas from an internal combustion engine, and more specifically can include exhaust gas from a diesel automobile, a gasoline automobile, a boiler, a gas turbine, and the like.

In particular, the nitrogen oxide reduction method using the catalyst is preferably a method where the nitrogen oxide is reduced in the presence of a reducing agent. Examples of the reducing agent can include at least one selected from among ammonia, urea, an organic amine, a hydrocarbon, an alcohol, a ketone, carbon monoxide, or hydrogen. The reducing agent is more preferably at least one selected from among ammonia, urea, and an organic amine because these further enhance nitrogen oxide reduction efficiency. In addition, when the gas containing nitrogen oxide includes a reducible substance such as at least one selected from among a hydrocarbon, carbon monoxide, and hydrogen, such reducible substances can be treated as the reducing agent.

EXAMPLES

Figure 1A:
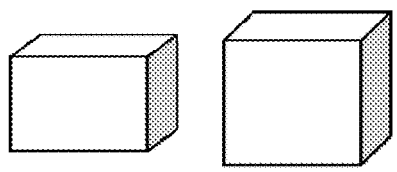
FIGS. 1A and 1B are schematic diagrams illustrating shapes of a crystal particle (where FIG. 1A illustrates a primary crystal particle and FIG. 1B illustrates an aggregate)
Figure 1B:
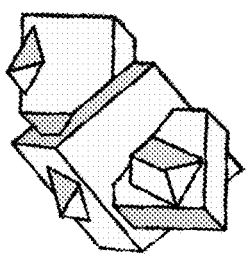

Hereafter, a detailed description of the present invention is given using working examples. However, the present invention is not limited to the following examples.

(Crystal Structure and Degree of Crystallinity)

Using a typical X-ray diffraction device (product name: MXP-3, manufactured by MAC Science), powder X-ray diffraction (hereafter also referred to as "XRD") measurement of a sample was performed under the following conditions.

Radiation source: CuK α rays ($\lambda$=1.5405 Å)
Measurement mode: Step scan
Scan condition: 0.04°/sec
Measurement time: 3 seconds
Measurement range: 2θ=4° to 44°

The resultant XRD pattern was compared with an XRD pattern listed on the homepage of the Structure Commission of the IZA, and the crystal structure of the sample was identified. In addition, the height of an XRD peak (2θ=21±1°) corresponding to a lattice spacing (d)=4.25 in the XRD pattern was taken as the degree of crystallinity.

($SiO_2/Al_2O_3$ Ratio)

The composition of the sample was measured using an X-ray fluorescence method. Based on a ratio of Si X-ray intensity to Al X-ray intensity, the $SiO_2/Al_2O_3$ ratio was calculated using a standard curve.

(Silanol Group Content)

The silanol group content in the chabazite-type zeolite was measured using $^1$H MAS NMR.

Prior to measurement, pretreatment was performed by holding the sample in vacuum evacuation for five hours at 400° C. to dehydrate. The chabazite-type zeolite, used as the sample, was treated for two hours at 600° C. under airflow, underwent ion exchange with a 20% ammonium chloride aqueous solution, and was dried overnight in atmosphere at 110° C. After pretreatment, the sample cooled to room temperature and was collected in a nitrogen atmosphere and weighed. A typical NMR measuring device (model name: VXR-3005, manufactured by Varian) was used as the measuring device. Measurement conditions are noted below.

Resonance frequency: 300.0 MHz
Pulse width: $\pi/2$
Measurement wait time: 10 sec
Cumulative trials: 32
Rotational frequency: 4 kHz
Shift reference: TMS Based on the $^1$H MAS NMR spectrum obtained, a peak of 2.0±0.5 ppm was taken as the peak belonging to the silanol group. Waveform separation of this peak was performed, and the integrated intensity of the peak was found. Based on the integrated intensity obtained, the amount of silanol in the sample was found using the standard curve method.

(SiOH/Si Ratio)

The silanol group content (mol/g) of the chabazite-type zeolite measured by $^1$H MAS NMR relative to the silicon content (mol/g) of the chabazite-type zeolite obtained by X-ray fluorescence analysis was found and expressed as the SiOH/Si ratio.

($Cu/Al_2O_3$ Ratio)

The copper content was measured using the ICP method. The sample was dissolved in a mixed solution of hydrofluoric acid and nitric acid, and this was used as the measured solution. Using a typical ICP device (model name: Optima 5300DV, manufactured by Perkin Elmer), the Al concentration, Cu concentration, Na concentration, and K concentration of the measured solution were measured. Based on these concentrations obtained, the $Cu/Al_2O_3$ ratio, $Na/Al_2O_3$ ratio, and $K/Al_2O_3$ ratio were found.

(Copper Content)

The measurement result of the $SiO_2/Al_2O_3$ ratio, and the measurement results of the $Cu/Al_2O_3$ ratio, $Na/Al_2O_3$ ratio, and $K/Al_2O_3$ ratio were used to find the copper content based on the following formula.

$$\text{Copper content (wt \%)} = (d \times M_{Cu} \times 100)/(M_{Al_2O_3} + a \cdot M_{SiO_2} + b/2 \cdot M_{Na_2O} + c/2 \cdot M_{K_2O} + d \cdot M_{CaO})$$

In the formula, a is the $SiO_2/Al_2O_3$ ratio (mol/mol), b is the $Na/Al_2O_3$ ratio (mol/mol), c is the $K/Al_2O_3$ ratio (mol/mol), d is the $Cu/Al_2O_3$ ratio (mol/mol), $M_{Cu}$ is the atomic mass of copper (63.5 g/mol), $M_{Al2O3}$ is the molar mass of $Al_2O_3$ (102.0 g/mol), $M_{SiO2}$ is the molar mass of $SiO_2$ (60.1 g/mol), $M_{Na2O}$ is the molar mass of $Na_2O$ (62.0 g/mol), $M_{K2O}$ is the molar mass of $K_2O$ (94.2 g/mol), and $M_{CuO}$ is the molar mass of CuO (79.5 g/mol).

(Method of Measuring Average Crystal Size)

Using a typical scanning electron microscope (model name: JSM-6390LV, manufactured by JEOL Ltd.), the sample was observed with the scanning electron microscope (hereafter referred to as "SEM"). The SEM observation was conducted at 10,000 times magnification. Based on the SEM image of the sample obtained from the SEM observation, 150 primary particles were selected at random and the horizontal Feret diameters of the particles were measured. The average value of the measured values was found, and was taken as the average crystal size for the sample.

(Measuring 10%-Volume Particle Size and 50%-Volume Particle Size)

One gram of powdered sample was mixed with 99 g of pure water to obtain a slurry, which was used as the measured sample. By treating the obtained slurry in an ultrasonic homogenizer for two minutes, the powdered sample in the slurry was dispersed. The volume particle size of the treated slurry was measured using laser diffraction/scattering to measure the 10%-volume particle size and the 50%-volume particle size. Based on the 10%-volume particle size and 50%-volume particle size obtained, a volume particle size ratio was calculated.

(Method of Measuring Nitrogen Oxide Reduction Rate (%))

The sample was molded and crushed, and flocculated particles having a flocculation diameter of 12 to 20 mesh were obtained. A normal-pressure, fixed-bed, flow-type reaction tube was filled with 1.5 mL of sample in the form of flocculated particles, a nitrogen oxide-containing gas was made to flow into the reaction tube at a predetermined temperature, and the concentrations of nitrogen oxide at the inlet and outlet of the normal-pressure, fixed-bed, flow-type reaction tube were measured. Conditions for the nitrogen oxide-containing gas flow are noted below.

Composition of nitrogen oxide-containing gas:
NO 200 ppm
$NH_3$ 200 ppm
$O_2$ 10 vol %
$H_2O$ 3 vol %
$N_2$ Balance
Flow rate of nitrogen oxide-containing gas: 1.5 L/min
Space velocity: 60,000 $hr^{-1}$ Based on the obtained concentrations of nitrogen oxide, the nitrogen oxide reduction rate was found using the formula below.

Nitrogen oxide reduction rate (%)={([NOx]in−[NOx]out)/[NOx]in}×100

[NOx]in is the nitrogen oxide concentration of the nitrogen oxide-containing gas at the inlet of the normal-pressure, fixed-bed, flow-type reaction tube, and [NOx]out is the nitrogen oxide concentration of the nitrogen oxide-containing gas at the outlet of the normal-pressure, fixed-bed, flow-type reaction tube.

Example 1

N,N,N-trimethyladamantane ammonium hydroxide 25% aqueous solution (hereafter also referred to as "TMADAOH 25% aqueous solution"), pure water, sodium hydroxide 48% aqueous solution, and amorphous aluminosilicate were added and mixed well, yielding a raw material composition having the following composition.

$SiO_2/Al_2O_3$ ratio=27.5
$TMADA/SiO_2$ ratio=0.081
$Na/SiO_2$ ratio=0.094
$K/SiO_2$ ratio=0
K/Na ratio=0
$H_2O/SiO_2$ ratio=12
$OH/SiO_2$ ratio=0.175

The raw material composition was sealed in a stainless steel autoclave, and was heated for 70 hours at 170° C. while rotating at 55 rpm. The post-heating product underwent solid/liquid separation, then the resultant solid phase was washed with a sufficient amount of pure water and was dried at 110° C.

The product was a single phase of chabazite-type zeolite, having an $SiO_2/Al_2O_3$ ratio of 26.2, an SiOH/Si ratio of $1.1 \times 10^{-2}$, an average crystal size of 0.6 μm, and a volume particle size ratio of 2.29.

Example 2

A product was obtained by a method similar to that of Example 1, except that TMADAOH 25% aqueous solution, pure water, sodium hydroxide 48% aqueous solution, potassium hydroxide 48% aqueous solution, and amorphous aluminosilicate were mixed to obtain a raw material composition having the following composition. This product served as the chabazite-type zeolite of the present example.

$SiO_2/Al_2O_3$ ratio=32.3
$TMADA/SiO_2$ ratio=0.081
$Na/SiO_2$ ratio=0.140
$K/SiO_2$ ratio=0.029
K/Na ratio=0.21
$H_2O/SiO_2$ ratio=18
$OH/SiO_2$ ratio=0.250

The chabazite-type zeolite of the present example was a single phase of chabazite-type zeolite, having an $SiO_2/Al_2O_3$ ratio of 30.2, an SiOH/Si ratio of $1.2 \times 10^{-2}$, an average crystal size of 1.0 μm, and a volume particle size ratio of 2.74.

The chabazite-type zeolite of the present example had absorption peaks at 1861 $cm^{-1}$, 3683 $cm^{-1}$, and 3732 $cm^{-1}$ in the IR spectrum. Accordingly, the chabazite-type zeolite of the present example was confirmed to have a peak 1, peak 2, and peak 3, but to not have a peak 4. In addition, the ratios of each absorption spectrum were IR $ratio_{P2/P1}$ 0.75, IR $ratio_{P3/P1}$ 1.67, and IR $ratio_{P4/P1}$ 0.

Example 3

A product was obtained by a method similar to that of Example 1, except that TMADAOH 25% aqueous solution, pure water, sodium hydroxide 48% aqueous solution, potassium hydroxide 48% aqueous solution, and amorphous aluminosilicate were mixed to obtain a raw material composition having the following composition. This product served as the chabazite-type zeolite of the present example.

$SiO_2/Al_2O_3$ ratio=32.3
$TMADA/SiO_2$ ratio=0.081
$Na/SiO_2$ ratio=0.111
$K/SiO_2$ ratio=0.058
K/Na ratio=0.52
$H_2O/SiO_2$ ratio=18
$OH/SiO_2$ ratio=0.250

The chabazite-type zeolite of the present example was a single phase of chabazite-type zeolite, having an $SiO_2/Al_2O_3$ ratio of 30.7, an SiOH/Si ratio of $1.3\times10^{-2}$, an average crystal size of 0.5 μm, and a volume particle size ratio of 2.63.

Example 4

A product was obtained by a method similar to that of Example 1, except that TMADAOH 25% aqueous solution, pure water, sodium hydroxide 48% aqueous solution, potassium hydroxide 48% aqueous solution, and amorphous aluminosilicate were mixed to obtain a raw material composition having the following composition. This product served as the chabazite-type zeolite of the present example.
$SiO_2/Al_2O_3$ ratio=32.3
$TMADA/SiO_2$ ratio=0.081
$Na/SiO_2$ ratio=0.149
$K/SiO_2$ ratio=0.020
K/Na ratio=0.13
$H_2O/SiO_2$ ratio=18
$OH/SiO_2$ ratio=0.250

The chabazite-type zeolite of the present example was a single phase of chabazite-type zeolite, having an $SiO_2/Al_2O_3$ ratio of 29.9, an SiOH/Si ratio of $1.3\times10^{-2}$, an average crystal size of 1.3 μm, and a volume particle size ratio of 2.19.

Example 5

A product was obtained by a method similar to that of Example 1, except that 13.0 g of TMADAOH 25% aqueous solution, 12.6 g of pure water, 0.4 g of sodium hydroxide 48% aqueous solution, and 30.9 g of amorphous aluminosilicate were mixed to obtain a raw material composition having the following composition. This product served as the chabazite-type zeolite of the present example.
$SiO_2/Al_2O_3$ ratio=32.3
$TMADA/SiO_2$ ratio=0.081
$Na/SiO_2$ ratio=0.094
$K/SiO_2$ ratio=0
K/Na ratio=0
$H_2O/SiO_2$ ratio=12
$OH/SiO_2$ ratio=0.175

The chabazite-type zeolite of the present example was a single phase of chabazite-type zeolite, having an $SiO_2/Al_2O_3$ ratio of 32.5, an SiOH/Si ratio of $1.3\times10^{-2}$, an average crystal size of 1.0 μm, and a volume particle size ratio of 2.06.

Comparative Example 1

A chabazite-type zeolite was synthesized using the method according to Japanese Patent Laid-open Publication No. 2010-168269. Specifically, TMADAOH 25% aqueous solution, pure water, sodium hydroxide 48% aqueous solution, potassium hydroxide 48% aqueous solution, and amorphous aluminosilicate were mixed to obtain a raw material composition having the following composition.
$SiO_2/Al_2O_3$ ratio=32.3
$TMADA/SiO_2$ ratio=0.081
$Na/SiO_2$ ratio=0.084
$K/SiO_2$ ratio=0.084
K/Na ratio=1.0
$H_2O/SiO_2$ ratio=18
$OH/SiO_2$ ratio=0.249

A product was obtained by a method similar to that of Example 1, except that the above raw material composition was used, and that the heating temperature was set to 150° C.

The chabazite-type zeolite of the present comparative example was a single phase of chabazite-type zeolite, having an $SiO_2/Al_2O_3$ ratio of 31.0, an SiOH/Si ratio of $1.7\times10^{-2}$, an average crystal size of 1.6 μm, and a volume particle size ratio of 1.23. Accordingly, the chabazite-type zeolite of the present comparative example had a large average particle size.

Comparative Example 2

A product was obtained by a method similar to that of Example 1, except that TMADAOH 25% aqueous solution, pure water, sodium hydroxide 48% aqueous solution, potassium hydroxide 48% aqueous solution, and amorphous aluminosilicate were mixed to obtain a raw material composition having the following composition. This product served as the chabazite-type zeolite of the present example.
$SiO_2/Al_2O_3$ ratio=27.0
$TMADA/SiO_2$ ratio=0.081
$Na/SiO_2$ ratio=0.140
$K/SiO_2$ ratio=0.029
K/Na ratio=0.21
$H_2O/SiO_2$ ratio=18
$OH/SiO_2$ ratio=0.250

The chabazite-type zeolite of the present example was a single phase of chabazite-type zeolite, having an $SiO_2/Al_2O_3$ ratio of 24.1, an SiOH/Si ratio of $1.0\times10^{-2}$, an average crystal size of 0.5 μm, and a volume particle size ratio of 3.47. Accordingly, the chabazite-type zeolite of the present comparative example had a small average particle size and powerful physical flocculation between particles.

Comparative Example 3

A product was obtained by a method similar to that of Example 1, except that TMADAOH 25% aqueous solution, pure water, sodium hydroxide 48% aqueous solution, potassium hydroxide 48% aqueous solution, and amorphous aluminosilicate were mixed to obtain a raw material composition having the following composition. This product served as the chabazite-type zeolite of the present comparative example.
$SiO_2/Al_2O_3$ ratio=23.3
$TMADA/SiO_2$ ratio=0.081
$Na/SiO_2$ ratio=0.140
$K/SiO_2$ ratio=0.029
K/Na ratio=0.21
$H_2O/SiO_2$ ratio=18
$OH/SiO_2$ ratio=0.250

The chabazite-type zeolite of the present comparative example was a single phase of chabazite-type zeolite, having an $SiO_2/Al_2O_3$ ratio of 21.0, an SiOH/Si ratio of $1.0\times10^{-2}$, an average crystal size of 0.3 μm, and a volume particle size ratio of 3.12. Accordingly, the chabazite-type zeolite of the present comparative example had an extremely small average particle size.

Comparative Example 4

A product was obtained by a method similar to that of Example 1, except that TMADAOH 25% aqueous solution, pure water, sodium hydroxide 48% aqueous solution, potassium hydroxide 48% aqueous solution, and amorphous aluminosilicate were mixed to obtain a raw material composition having the following composition. This product served as the chabazite-type zeolite of the present comparative example.

$SiO_2/Al_2O_3$ ratio=14.7
$TMADA/SiO_2$ ratio=0.081
$Na/SiO_2$ ratio=0.140
$K/SiO_2$ ratio=0.029
$K/Na$ ratio=0.21
$H_2O/SiO_2$ ratio=18
$OH/SiO_2$ ratio=0.250

The chabazite-type zeolite of the present comparative example was a single phase of chabazite-type zeolite, having an $SiO_2/Al_2O_3$ ratio of 13.7, an SiOH/Si ratio of $0.6 \times 10^{-2}$, an average crystal size of 0.5 μm, and a volume particle size ratio of 1.67. Accordingly, the chabazite-type zeolite of the present comparative example had a low $SiO_2/Al_2O_3$ ratio.

Comparative Example 5

A product was obtained by a method similar to that of Example 1, except that TMADAOH 25% aqueous solution, pure water, potassium hydroxide 48% aqueous solution, and amorphous aluminosilicate were mixed to obtain a raw material composition having the following composition. This product served as the chabazite-type zeolite of the present comparative example.

$SiO_2/Al_2O_3$ ratio=29.5
$TMADA/SiO_2$ ratio=0.081
$Na/SiO_2$ ratio=0
$K/SiO_2$ ratio=0.169
$K/Na$ ratio=∞
$H_2O/SiO_2$ ratio=18
$OH/SiO_2$ ratio=0.250

The chabazite-type zeolite of the present comparative example was a single phase of chabazite-type zeolite, having an $SiO_2/Al_2O_3$ ratio of 26.9, an average crystal size of 1.5 μm, and a volume particle size ratio of 1.96.

Comparative Example 6

Synthesis of SSZ-13 was carried out using a method according to the methods of Examples 1 and 5 in U.S. Pat. No. 4,665,110. Specifically, 105 ml of dimethyl formamide (Kishida Chemical) was added to 17.5 g of 1-adamantane amine (Sigma-Aldrich) to create a solution. After solution, 50.8 g of tributylamine (Kishida Chemical) was added and, while mixing the solution on ice, 49.7 g of methyl iodide (Wako Pure Chemical) was slowly added by drip.

After the drip of methyl iodide, the solution was stirred for five days to induce reaction, and a white precipitate was obtained. The white precipitate was washed five times with 100 mL of diethyl ether (Kishida Chemical), and was dried under reduced pressure to obtain a white powder.

As a result of elemental analysis and NMR measurement of the obtained white powder, the white powder was identified as N,N,N-trimethyladamantammonium iodide (hereafter referred to as "Template A").

In water, 13.6 g of Ludox AS-30 and 5.3 g of Template A were mixed to yield Solution 1. Also, 1.1 g of $Al_2(SO_4)_3 \cdot 18H_2O$ and 2.91 g of solid potassium hydroxide were mixed in water to yield Solution 2.

Solution 2 was added to Solution 1 and mixed to yield a uniformly milky-white solution. An 80 mL stainless steel reaction vessel was filled with the mixed solution and sealed, and the reaction vessel was heated for six days at 150° C. while rotating at 30 rpm, yielding a product. The resultant product was washed with water, methanol, and acetone, in that order, and was dried at 110° C. to yield a white powder.

Figure 2:
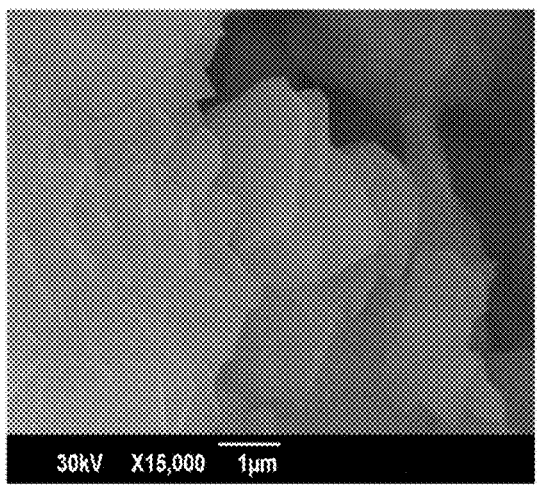
FIG. 2 is a SEM observation image of a chabazite-type zeolite according to Comparative Example 6 (top image: 15,000 times magnification; bottom image: 1,000 times magnification)
Figure 2:
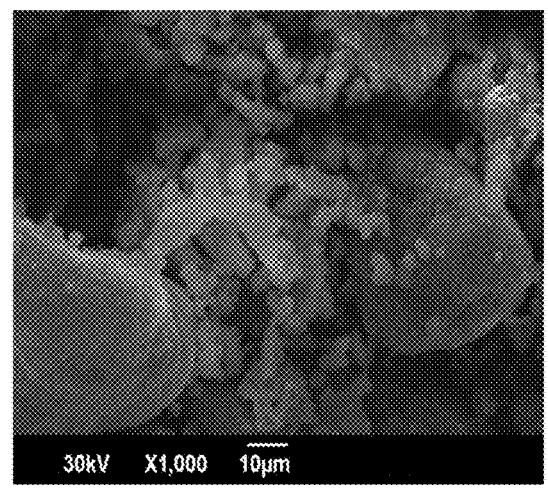

The resultant white powder was confirmed to be a single phase of SSZ-13. However, as illustrated in FIG. 2, the crystal morphology involved a plurality of crystals chemically flocculating irregularly to grow irregularly shaped aggregates, and a cuboid or rhomboid ridge was confirmed on a portion of the aggregates. However, no independent primary particles could be verified for the chabazite-type zeolite of the present comparative example, and the average crystal size of the zeolite could not be evaluated. The $SiO_2/Al_2O_3$ ratio was 28.3. The volume particle size ratio was 3.97, and the particles were confirmed to be extraordinarily aggregated.

Evaluation results for the chabazite-type zeolites of the examples and comparative examples described above are given in the following table.

TABLE 3

|  | $SiO_2/Al_2O_3$ ratio | SiOH/Si ratio | Amount of silanol ($\times 10^{20}$ parts/g) | Average crystal size (μm) | Volume particle size ratio | 50%-volume particle size (μm) |
| --- | --- | --- | --- | --- | --- | --- |
| Example 1 | 26.2 | $1.10 \times 10^{-2}$ | 1.10 | 0.6 | 2.29 | 4.0 |
| Example 2 | 30.2 | $1.20 \times 10^{-2}$ | 1.20 | 1.0 | 2.74 | 3.1 |
| Example 3 | 30.7 | $1.30 \times 10^{-2}$ | 1.30 | 0.5 | 2.63 | 2.3 |
| Example 4 | 29.9 | $1.30 \times 10^{-2}$ | 1.30 | 1.3 | 2.19 | 5.4 |
| Example 5 | 32.5 | $1.30 \times 10^{-2}$ | 1.30 | 1.0 | 2.06 | 4.2 |
| Comparative Example 1 | 31.0 | $1.70 \times 10^{-2}$ | 1.70 | 1.6 | 1.23 | 3.8 |
| Comparative Example 2 | 24.1 | $1.00 \times 10^{-2}$ | 1.00 | 0.5 | 3.47 | 6.0 |
| Comparative Example 3 | 21.0 | $1.00 \times 10^{-2}$ | 1.00 | 0.3 | 3.12 | 18.0 |
| Comparative Example 4 | 13.7 | $0.60 \times 10^{-2}$ | 0.60 | 0.5 | 1.67 | 4.0 |
| Comparative Example 5 | 26.9 |  |  | 1.5 | 1.96 | 3.1 |
| Comparative Example 6 | 28.3 |  |  |  | 3.97 | 2.3 |

These examples confirm that the manufacturing method of the examples is capable of manufacturing a chabazite-type zeolite having an $SiO_2/Al_2O_3$ ratio of 15 or greater, an SiOH/Si ratio of $1.6 \times 10^{-2}$ or less, an average crystal size of 0.5 μm to less than 1.5 μm, and a volume particle size ratio of 3.2 or less, and that a chabazite-type zeolite having characteristics different from those of the comparative examples can be obtained using the manufacturing method. In addition, the raw material compositions did not contain a compound that contains fluorine or chlorine, and the chlorine and fluorine content of the resultant chabazite-type zeolites was at or below a detection threshold.

Comparative Example 1 and Example 5 are both synthetic chabazite-type zeolites obtained from a raw material composition that contains only TMAD$^+$ as the organic structure directing agent. Compared to the chabazite-type zeolite of Comparative Example 1, the chabazite-type zeolite of Example 5 has a low SiOH/Si ratio despite having a high $SiO_2/Al_2O_3$ ratio. Accordingly, the chabazite-type zeolite of Example 5 was confirmed to have a lower SiOH/Si ratio than conventional chabazite-type zeolites.

Despite the chabazite-type zeolites of Example 3 and Comparative Example 2 having identical average crystal sizes, the volume particle size ratio of Comparative Example 2 was greater than 3.2. Accordingly, physical flocculation was confirmed to be less likely to occur in the chabazite-type zeolite of Example 3 as compared to conventional chabazite-type zeolites.

The average crystal size was identical in Examples 2 and 5, and was larger than in Example 3. However, the volume particle size ratio of Example 3 was an intermediate value between Examples 2 and 5, and the 50%-volume particle size was different from those of Examples 2 and 5. Accordingly, the average crystal size, the volume particle size ratio, and the 50%-volume particle size were confirmed to have no direct correlation to one another. In addition, there was confirmed to be no direct relationship between the particle size of the primary particles and the ease with which agglomerates form in the chabazite-type zeolite according to the embodiment of the present invention.

Measurement Example 1 (Evaluation of Heat Resistance)

The chabazite-type zeolites of Example 2 and Comparative Example 2 were each treated for two hours at 600° C. under airflow, after which the zeolites each underwent ion exchange with a 20% ammonium chloride aqueous solution. After ion exchange, the zeolites were dried overnight in atmosphere at 110° C., and the cation type was given as NH$_4$-type chabazite-type zeolite.

Major XRD peaks for the chabazite-type zeolite of Example 2 following treatment are given in the following table.

TABLE 4

| 2θ | Relative intensity |
|---|---|
| 9.62 | 169 |
| 16.24 | 37 |
| 17.94 | 34 |
| 20.88 | 100 |
| 25.24 | 31 |
| 31.02 | 51 |

*Relative intensity is the value relative to an intensity of 2θ = 20.88°

(Hydrothermal Durability Treatment)

The NH$_4$-type chabazite-type zeolite was molded and ground, and flocculated particles having a flocculation diameter of 12 to 20 mesh were obtained. After filling a normal-pressure, fixed-bed, flow-type reaction tube with 3 mL of chabazite-type zeolite flocculated particles, air containing 10 vol % moisture was made to flow over the zeolite, and a hydrothermal durability treatment was conducted under the following conditions.

Air flow speed: 300 mL/min
Treatment temperature: 900° C.
Treatment time: Two hours (Measuring Degree of Crystallinity)

The post-hydrothermal durability treatment chabazite-type zeolites were each measured by XRD and the degree of crystallinity was found. The degree of crystallinity of the post-hydrothermal durability treatment chabazite-type zeolite of Example 2 was taken as 100%. The measurement results for the degree of crystallinity are given in the following table.

TABLE 5

| | Degree of crystallinity |
|---|---|
| Example 2 | 100% |
| Comparative Example 1 | 89% |
| Comparative Example 2 | 89% |

The table above shows that the chabazite-type zeolite of Example 2 has a higher degree of crystallinity following hydrothermal durability treatment than do conventional chabazite-type zeolites. Thus, the chabazite-type zeolite according to the present invention was confirmed to have high thermal resistance.

Example 6

The chabazite-type zeolite of Example 1 was calcined for two hours at 600° C. under airflow, after which the zeolite was treated with a 20% ammonium chloride aqueous solution. After treatment, the chabazite-type zeolite was dried overnight in atmosphere at 110° C., and the cation type was given as ammonium-type (NH$_4$-type) chabazite-type zeolite. A copper nitrate solution was added by drip to 10 g of the NH$_4$-type chabazite-type zeolite and mixed in a mortar, and the copper was introduced to the chabazite-type zeolite via impregnation support. The copper nitrate aqueous solution used was a solution of 1.1 g of copper nitrate trihydrate dissolved in 5.0 g of pure water.

After impregnation support, the solution was dried overnight in atmosphere at 110° C., after which the solution was calcined for two hours in atmosphere at 550° C., and a copper-containing chabazite-type zeolite of the present example was obtained. The copper-containing chabazite-type zeolite of the present example had a copper content of 2.8 wt % and a $Cu/Al_2O_3$ ratio of 0.78.

Example 7

The copper-containing chabazite-type zeolite of the present example was obtained by a method similar to that of Example 6, except that the chabazite-type zeolite of Example 2 was used, and that a solution of 1.0 g of copper nitrate trihydrate dissolved in 5.0 g of pure water was used as the copper nitrate aqueous solution. The copper-containing chabazite-type zeolite of the present example had a copper content of 2.6 wt % and a $Cu/Al_2O_3$ ratio of 0.78.

Example 8

The copper-containing chabazite-type zeolite of the present example was obtained by a method similar to that of Example 6, except that the chabazite-type zeolite of Example 5 was used, and that a solution of 0.9 g of copper nitrate trihydrate dissolved in 5.0 g of pure water was used as the copper nitrate aqueous solution. The copper-containing chabazite-type zeolite of the present example had a copper content of 2.5 wt % and a $Cu/Al_2O_3$ ratio of 0.81.

Comparative Example 7

The copper-containing chabazite-type zeolite of the present comparative example was obtained by a method similar to that of Example 6, except that the chabazite-type zeolite of Comparative Example 1 was used, and that a solution of 1.0 g of copper nitrate trihydrate dissolved in 5.0 g of pure water was used as the copper nitrate aqueous solution. The copper-containing chabazite-type zeolite of the present comparative example had a copper content of 2.5 wt % and a $Cu/Al_2O_3$ ratio of 0.78.

Comparative Example 8

The copper-containing chabazite-type zeolite of the present comparative example was obtained by a method similar to that of Example 6, except that the chabazite-type zeolite of Comparative Example 2 was used, and that a solution of 1.2 g of copper nitrate trihydrate dissolved in 5.0 g of pure water was used as the copper nitrate aqueous solution. The copper-containing chabazite-type zeolite of the present comparative example had a copper content of 3.1 wt % and a $Cu/Al_2O_3$ ratio of 0.77.

Comparative Example 9

The copper-containing chabazite-type zeolite of the present comparative example was obtained by a method similar to that of Example 6, except that the chabazite-type zeolite of Comparative Example 3 was used, and that a solution of 1.3 g of copper nitrate trihydrate dissolved in 4.3 g of pure water was used as the copper nitrate aqueous solution. The copper-containing chabazite-type zeolite of the present comparative example had a copper content of 3.3 wt % and a $Cu/Al_2O_3$ ratio of 0.73.

Comparative Example 10

The copper-containing chabazite-type zeolite of the present comparative example was obtained by a method similar to that of Example 6, except that the chabazite-type zeolite of Comparative Example 4 was used, and that a solution of 1.2 g of copper nitrate trihydrate dissolved in 5.0 g of pure water was used as the copper nitrate aqueous solution. The copper-containing chabazite-type zeolite of the present comparative example had a copper content of 2.7 wt % and a $Cu/Al_2O_3$ ratio of 0.47.

Evaluation results for the copper-containing chabazite-type zeolites of Examples 6 to 8 and Comparative Examples 7 to 10 are given in the following table.

TABLE 6

| | $SiO_2/Al_2O_3$ ratio | $Cu/Al_2O_3$ ratio | Copper content (wt %) |
|---|---|---|---|
| Example 6 | 26.2 | 0.78 | 2.8 |
| Example 7 | 30.2 | 0.78 | 2.6 |
| Example 8 | 32.5 | 0.81 | 2.5 |
| Comparative Example 7 | 31.0 | 0.78 | 2.5 |
| Comparative Example 8 | 24.1 | 0.77 | 3.1 |
| Comparative Example 9 | 21.0 | 0.73 | 3.3 |
| Comparative Example 10 | 13.7 | 0.47 | 2.7 |

Measurement Example 2 (Measuring Nitrogen Oxide Reduction Rate)

Samples of the copper-containing chabazite-type zeolites of Example 6 and Comparative Examples 7 and 10 (hereafter also referred to as "endurance treatment samples (2)") were created that had been subjected to hydrothermal endurance treatment using a method similar to that of Measurement Example 1. The nitrogen oxide reduction rates of the resultant endurance treatment samples (2) at 150° C. were measured. Results are given in the following table.

TABLE 7

| | Average crystal size (μm) | $SiO_2/Al_2O_3$ ratio | $Cu/Al_2O_3$ ratio | Nitrogen oxide reduction rate (%) |
|---|---|---|---|---|
| Example 6 | 0.6 | 26.2 | 0.78 | 45 |
| Comparative Example 7 | 1.6 | 31.0 | 0.78 | 29 |
| Comparative Example 10 | 0.5 | 13.7 | 0.47 | 12 |

Compared to Example 6, the copper-containing chabazite-type zeolite of Comparative Example 7 has an equal $Cu/Al_2$ ratio, but the $SiO_2/Al_2O_3$ ratio is higher and the average crystal size is larger. Regardless, the nitrogen oxide reduction rate of Comparative Example 7 was lower than those of Example 6. Accordingly, even when compared to a conventional chabazite-type zeolite having heat resistance improved by increasing the crystal size, the copper-containing chabazite-type zeolite of the present example was confirmed to have equal or superior heat resistance, and to have an elevated nitrogen oxide reduction rate after exposure to high temperature and high humidity, without increasing the crystal size.

Moreover, samples of the copper-containing chabazite-type zeolites of Examples 6 to 8 and Comparative Examples 7 to 9 (hereafter also referred to as "durability treatment samples (3)") were created that had been subjected to hydrothermal durability treatment using a method similar to that of Measurement Example 1, except that the treatment time was 3 hours. The nitrogen oxide reduction rates of the resultant durability treatment samples (3) at 150° C. were measured. Results are given in the following table.

TABLE 8

| | Average crystal size (μm) | SiO$_2$/Al$_2$O$_3$ ratio | Cu/Al$_2$O$_3$ ratio | Nitrogen oxide reduction rate (%) |
|---|---|---|---|---|
| Example 6 | 0.6 | 26.2 | 0.78 | 27 |
| Example 7 | 1.0 | 30.2 | 0.78 | 31 |
| Example 8 | 1.0 | 32.5 | 0.81 | 35 |
| Comparative Example 7 | 1.6 | 31.0 | 0.78 | 16 |
| Comparative Example 8 | 1.5 | 24.1 | 0.77 | 18 |
| Comparative Example 9 | 0.3 | 21.0 | 0.73 | 4 |

By comparing Examples 6 and 7, the nitrogen oxide reduction rate at low temperatures after hydrothermal durability treatment was confirmed to be increased by increasing the crystal size and the SiO$_2$/Al$_2$O$_3$ ratio. In contrast, for Comparative Example 7, even though the crystal size and the SiO$_2$/Al$_2$O$_3$ ratio were larger than those of Example 7, the nitrogen oxide reduction rate was approximately half that of Example 7. Accordingly, the copper-containing chabazite-type zeolites of Examples were confirmed to have a dramatically elevated nitrogen oxide reduction rate at low temperatures as compared to conventional copper-containing chabazite-type zeolites.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

INDUSTRIAL APPLICABILITY

The chabazite-type zeolite of the present invention can be used as an adsorbent or catalyst, and in particular can be used as an adsorbent or catalyst to be used at high temperatures. The chabazite-type zeolite of the present invention can be used as a catalyst incorporated into an exhaust gas treatment system. In particular, the chabazite-type zeolite of the present invention can be used as an SCR catalyst, and furthermore as an SCR catalyst integrated with a DPF, that reduces and eliminates nitrogen oxides in the exhaust gas of automobiles, and particularly diesel vehicles, in the presence of a reducing agent.

The present application claims priority under 35 U.S.C. § 119 of Japanese Patent Application No. 2017-030725, filed on Feb. 22, 2017, the disclosure of which, including the specification, claims, and abstract is expressly incorporated by reference herein in its entirety.

What is claimed is:

1. A process for producing a chabazite-type zeolite having a silica-to-alumina molar ratio of no less than 15, a silanol group to silicon molar ratio of no more than 1.6×10$^{-2}$, an average crystal size of 0.5 μm to less than 1.5 μm, and a 50%-volume particle size to 10%-volume particle size of no more than 3.2, comprising crystallizing a composition that contains a silica source, aluminum source, alkali source, structure directing agent, and water, where the composition has a sodium to silica molar ratio greater than zero, a potassium to sodium molar ratio less than 1.0, a structure directing agent to silica molar ratio less than 0.1, a water to silica molar ratio less than 20, and a silica to alumina molar ratio of 27.5 to less than 50.0.

2. The process according to claim 1, wherein the structure directing agent is at least one selected from among an N,N,N-trialkyladamantane ammonium cation, an N,N,N-trimethylbenzyl ammonium cation, an N-alkyl-3-quinuclidinol cation, and an N,N,N-trialkyl exoaminonorbornane cation.

3. The process according to claim 1, wherein the structure directing agent to silica molar ratio is 0.06 to less than 0.1.

4. The process according to claim 1, wherein the potassium to sodium molar ratio is 0 to no more than 0.6.

5. The process according to claim 1, wherein the composition does not contain fluorine.

* * * * *